Sept. 26, 1961 C. M. FRYE 3,001,808
TELESCOPIC TUBULAR PIT PROPS
Filed Jan. 27, 1958 2 Sheets-Sheet 1

INVENTOR
COLIN MICHAEL FRYE
BY Reynolds, Beach & Christensen
ATTORNEYS

INVENTOR
COLIN MICHAEL FRYE

3,001,808
TELESCOPIC TUBULAR PIT PROPS
Colin Michael Frye, St. Andrews, Mitton, near Tewkesbury, England., assignor to Dowty Mining Equipment Limited, Ashchwich, Tewkesbury, England, a British company
Filed Jan. 27, 1958, Ser. No. 711,456
Claims priority, application Great Britain Jan. 31, 1957
1 Claim. (Cl. 286—26)

This invention relates to fluid pressure operated cylinder and ram devices such as pit props and jacks, wherein two relatively telescoping tubes slide one with respect to the other. In fluid pressure operated pit props it is usual to provide a bearing and gland ring assembly at the open end of the outer tube, such ring assembly providing a bearing for the inner tube or ram as well as a seal to exclude dirt and moisture, and being provided with an internal screw thread to engage an external thread formed at the end of the said inner tube.

It is an object of this invention to provide a construction of such a pit prop enabling the use of drawn steel tubing as the telescopingly connected members of the prop, and to provide a simple form and mounting of a bearing ring, accurately machinable before installation, whereby the inner tube is maintained out of contact with the outer tube, yet the two tubes are accurately guided and strongly braced against bending loads. The end result is that the props can be of simple construction, and relatively inexpensive, despite small departures from straightness and roundness which are known to exist in such tubing, and enabling a designer to take advantage of the known excellent resistance of such tubing to bursting and compression stresses. Further, it is an object to provide a construction as stated wherein, in the event of full contraction of the prop under load, the load is transmitted directly from the one tube to the other, inasmuch as a bearing member of one will then rest directly upon a support member of the other.

It is also an object of this invention to provide an improved and alternative construction of the outer tube and the bearing ring or gland ring fitted thereto avoiding machining operations on the tubes themselves, such as the cutting of threads on the tube end, and achieving substantial economies in manufacture and ease of assembly and dismantling, by confining operations on the tube to flaring, and confining machining operations to a separate bearing ring capable of being finished before its installation.

Another object is to provide an improved bearing ring in combination with a scraper ring, which, besides cleaning the outer surface of the ram tube, may also serve to retain one or more components of the assembly in position.

According to the invention, the plain end of the outer tube from which the ram emerges is flared away from the ram, and this flared end portion, defining a conical-walled annular socket, in the form illustrated, receives a bearing ring machined from mild steel or the like, and having a flange abutting against the flared tube end and a spigot fitting the annular socket between the flared end and the ram. The bore of this bearing ring should be less than the bore of the outer tube, so that it may form or support a slide bearing for the ram such as to eliminate contact between the tubes, and may, additionally, serve as a retainer for a packing ring.

In a construction particularly suitable for hydraulic pit props, the bearing ring is surmounted and encircled by a metal ring, which may serve both as a retaining ring and a scraper ring. For this purpose the ring may have an axially or obliquely directed scraping edge to remove scale and other dirt from the ram. Such ring may be secured to the flared tube, for example, by tack welding, thus serving as a convenient means to retain the assembly in position. For ease of dismantling and replacement, the bearing ring may be of split construction, the segments of which may be laterally removed without fully withdrawing the inner tube. In this case any packing ring, e.g. a wiper ring, which may be fitted to the bearing ring is preferably located remote from the spigoted part of the bearing ring and is retained in position and protected by a lip of the scraper ring adjacent the cutting edge thereof.

In another construction a backing ring having an outer surface complementally fitting the inner surface of the flare may be spaced from the spigot portion of the bearing ring to provide an annular recess for the packing ring. This packing ring is preferably of resilient rubber or like material so as to be readily fitted into or removed from the recess, and it may constitute a main pressure seal, or a wiper ring to exclude foreign matter.

The invention will now be described in more detail, with reference to the examples shown in the accompanying drawings in which.

Figure 1:
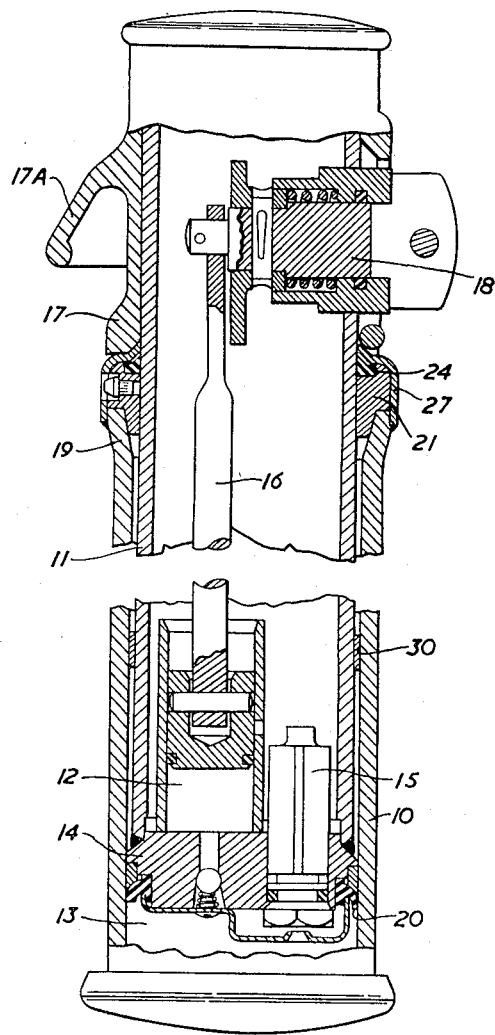
FIGURE 1 shows the general arrangement in cross-section of a hydraulic pit prop.

Referring to FIGURE 1, the prop comprises basically an outer tube 10 the main portion of which has substantially uniform internal and external diameters. A ram tube 11 is slidably mounted in the outer tube and its interior forms a reservoir for liquid which may be pumped by a pump 12 from the interior of the ram to the lower part 13 of the cylinder which forms the pressure chamber of the prop. The lower end of the ram tube is closed by a disc 14 which slidably supports the lower end of the ram tube within the outer tube 10 and which provides a mounting for a pump 12, a relief valve 15 and a fluid seal 20. The pump 12 is a simple piston and cylinder operated by a reciprocating rod 16 extending to the upper end of the ram. The upper end of the ram tube 11 supports a cap or ferrule 17 having a depending skirt which forms an abutment shoulder cooperable with the outer tube 10 in a manner to be described. The skirt may be formed with a hand grip 17a serving to facilitate extension of the prop. Manual operating means for the rod 16 is provided in the upper part of the ram and is indicated generally by the reference 18. A manually operable release valve will also be provided, although not shown here, and it will not be necessary here to refer to the above mentioned parts in more detail.

Figure 2:
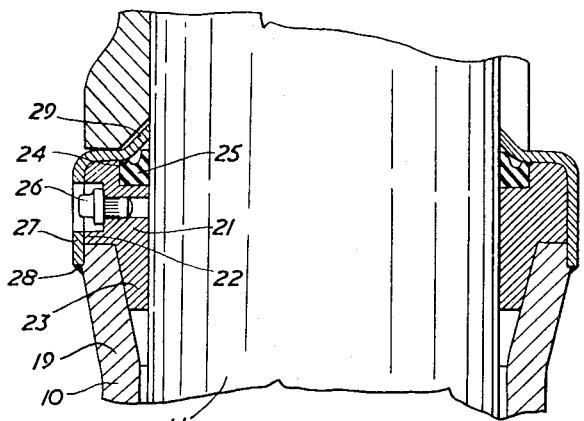
FIGURE 2 shows on a larger scale the construction of the flared tube end and the bearing ring with an external scraper ring applied thereto according to the invention.

Referring now to FIGURE 2, the upper end portion of the outer tube 10 is flared at 19 on both its internal and external surfaces and the two halves of a diametrally split bearing ring 21 are assembled thereto. The ring has a radial flange 22 abutting against the transverse end surface of the flared portion 19 and a spigot portion 23 seating against the internal surface of the flared end portion 19, and a cylindrical bore concentric with but of lesser diameter than the internal surface of the outer tube 10. The ring 21 is rebated at the outer end to receive a resilient wiper ring 24 having a concave upper face, the base of the said ring being seated on the radial face of the rebate and a lip 25 of the wiper ring bearing against the ram tube.

A lubricating nipple 26 is inserted in the ring 21 to enable the interface between the ring and the ram tube 11 to be lubricated and flushed out.

A retaining ring 27 of mild steel has an inwardly directed portion overlying the upper surface of the bearing ring 21 and the wiper ring 24, and a skirt portion extending over the outer portion of the bearing ring 21 into overlapping engagement with the flared end portion 19 to which it is secured by tack welds 28. In this manner, or by tack welding it directly, or in any other suitable manner, the bearing ring 21 is fixed to the flared end portion 19.

The inwardly directed portion of the retaining ring 27 has an obliquely directed scraper edge 29 designed to remove dirt and scale.

When fitting the rings 21 and 27, both are held on the outer tube 10 by end pressure on the top flange and then welded. The pressure of the ring 27 on the outer edge of the wiper ring 24 seals the latter to the bearing ring 21 thus preventing ingress of moisture around the bearing ring. The end of the spigot 23 of the ring 21 serves as a retaining abutment for the end stop ring 30 (shown in FIGURE 1), which is normally fitted to the ram tube 11, to prevent inadvertent dismantling of the prop. If the prop becomes fully contracted under excessive roof load such axial load will be transmitted from the cap portion 17 direct through the bearing ring 21 to the outer tube 10, thus leaving the ram tube 11 free from any overload.

Unlike the usual threaded bearing ring, the ring above described can be easily removed, since it is of split construction, and the wiper ring 24 can be stretched sufficiently to pass over the stop ring 30 and the projecting lower end 14 of the ram when dismantling the prop.

Figure 3:
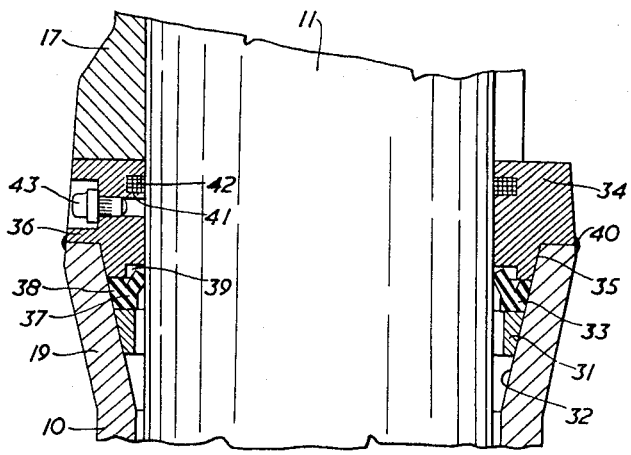
FIGURE 3 shows a further construction without an external scraper ring.

In another embodiment shown in FIGURE 3, the scraper ring and wiper ring are differently arranged.

The open end of the outer tube 10 is flared at 19 as before, and within the annular socket formed by the flare there is placed a frustum shaped metal spacing ring 31 fitting the inner surface 32 of the flare. Above the spacing ring 31, there is placed a packing ring 33, which, in the arrangement here described, serves the purpose of a wiper ring and is generally of V-section with its base resting on the spacing ring 31. The open end of the socket is again closed by a metal bearing ring 34, which has a rather short spigot portion 35 closely fitted to the inside conical surface of the flared end and a radial flange 36 abutting against the flared end 19 of the tube 10.

As in the example above described, the bore of the bearing ring 34 slidably receives the ram tube 11 to form a bearing for the latter when extending and contracting the prop. The inner end of the spigot 35 bears against the outer flange 38 of the packing ring 33, while the inner flange 37 of the packing ring is received in a rebate 39 of the bearing ring 34. The bearing ring 34 may itself be secured to the flared end 19 by several tack welds 40 spaced round the tube at suitable intervals.

The bearing ring 34 is recessed at 41 to receive a metal scraper ring 42 which closely engages the inner tube. A lubricating nipple 43 is fitted for the purpose already described.

The above described embodiment of the invention employs the packing ring 24 or 33 as a low pressure wiper ring, the hydraulic pressure being taken by the seal 20 at the foot of the ram tube 11. It may however, in some cases be desirable to use the packing ring as a high pressure seal in which case the packing ring may be of different cross-section so as to present a concave surface to the hydraulic pressure, the other elements of the assembly remaining substantially unchanged.

The construction according to the invention greatly facilitates the manufacture and assembly of pit props and other fluid operated cylinder and ram devices because it avoids the expense of threading the tube end and fitting a threaded bearing ring of normal construction. Moreover the plain bearing ring abutting against the flared tube end can take a large end thrust, without damage, than a threaded ring. Also in the case where the bearing ring is of split construction, further advantages of easy maintenance and assembly are obtained.

I claim as my invention:

A fluid pressure operated prop comprising an outer tube having a main portion with substantially uniform internal and external diameters and an upper end portion which is outwardly flared on its internal and external surfaces, said upper end portion terminating in a transverse abutment face, a bearing ring having a spigot portion seated against the internally flared surface of the upper end portion, a radially directed flange seated upon the transverse abutment face, a cylindrical bore concentric with but of lesser diameter than the internal surface of the outer tube, and a rebate between the upper surface of the bearing ring and the bore, a resilient wiper ring seated in the rebate, a retaining ring having an inwardly directed portion overlying the upper surface of the bearing ring and the wiper ring and a skirt portion extending over the outer portion of the bearing ring into overlapping engagement with the external surface of the upper end portion of the outer tube, and a ram tube extending through the upper end portion of the outer tube in slidable engagement with the cylindrical bore of the bearing ring and with the wiper ring.

References Cited in the file of this patent

UNITED STATES PATENTS

| | | |
|---|---|---|
| 334,037 | Nash | Jan. 12, 1886 |
| 933,789 | Sessions | Sept. 14, 1909 |
| 1,232,028 | Harris | July 3, 1917 |
| 1,482,716 | Sudekum | Feb. 5, 1924 |
| 1,631,520 | Creevy | June 7, 1927 |
| 1,850,489 | Baguley | Mar. 22, 1932 |
| 2,243,782 | Thornhill | May 27, 1941 |
| 2,247,031 | Norton | June 24, 1941 |
| 2,290,507 | Thompson | July 21, 1942 |
| 2,473,470 | Fall | June 14, 1949 |
| 2,621,631 | Dowty | Dec. 16, 1952 |
| 2,678,835 | Clark | May 18, 1954 |
| 2,726,882 | Ryant | Dec. 13, 1955 |

FOREIGN PATENTS

| | | |
|---|---|---|
| 608,054 | Great Britain | Sept. 9, 1948 |